United States Patent
Rodgers et al.

(10) Patent No.: US 6,493,650 B1
(45) Date of Patent: Dec. 10, 2002

(54) DEVICE FOR AUTOMATIC DOCUMENTATION OF CRASH SCENES

(75) Inventors: Charles Edward Rodgers, Saint Leonard, MD (US); Darrell Froncis Greenlee, Laurel, MD (US)

(73) Assignee: Optimus Corporation, Silver Spring, MD (US)

( * ) Notice: Subject to any disclaimer, the term of this patent is extended or adjusted under 35 U.S.C. 154(b) by 0 days.

(21) Appl. No.: 09/492,857

(22) Filed: Jan. 27, 2000

(51) Int. Cl.[7] .............................................. G06F 19/00
(52) U.S. Cl. .................... 702/150; 701/35; 340/815.69; 340/438
(58) Field of Search ................................ 702/150, 155, 702/159, 28, 29; 701/35, 36; 340/815.69, 438, 439; 700/90

(56) References Cited

U.S. PATENT DOCUMENTS 5,483,442 A * 1/1996 Black et al. .................. 700/90
5,696,705 A * 12/1997 Zykan ...................... 250/201.6
6,188,939 B1 * 2/2001 Morgan et al. ......... 340/815.69
6,246,933 B1 * 6/2001 Bague ......................... 340/438

* cited by examiner

Primary Examiner—Kamni Shah (57) ABSTRACT

Crash scene measurement, documentation, and analysis is used to determine crash dynamics and causes in order to determine fault, liability, and prevention methods. The device to be patented is a low cost, compact system that significantly enhances the speed and accuracy of crash scene documentation, and it is applicable to aviation, highway, railway, and vessel crashes. The system will use highly accurate, kinematic, Differential Global Positioning System (DGPS) measurements to locate crash scene elements and reference points with a relative measurement error of less than two centimeters (0.79 in.). Using a government DGPS reference signal (National DGPS, US Coast Guard) or locating the reference module on a geodetic marker, allows the absolute location of the scene to be determined with an error of between three to five meters. Once the scene is measured, the device automatically develops accurate dimensions, scene drawing, and a standard report of the crash.

14 Claims, 7 Drawing Sheets

Canadian Marconi Allstar Receiver Block Diagram

Earth Centered, Earth Fixed X, Y, Z

*Figure 7*

DEVICE FOR AUTOMATIC DOCUMENTATION OF CRASH SCENES

TECHNICAL FIELD OF THE INVENTION

The present invention relates generally to an automated measurement and documentation system, in particular, to a method and apparatus for automated measurement and documentation of crash scenes.

BACKGROUND OF THE INVENTION

Crash scene analysis is performed to determine the causes and circumstances of crashes in order to make the transportation mode safer in the future, and to determine criminal and civil liability. The position and orientation of vehicles, vessels, aircraft, and their pieces relative to each other and the scene features is important in attempting to determine the crash dynamics and cause.

Currently, crash scene measurements are done manually with wheel and tape measures. The data are recorded by hand and the analysis is done through manual calculation. The results of the measurements and calculations are captured on hand drawn sketches. The scene elements can only be located relative to each other and any nearby landmarks. Scene measurements are two dimensional, providing only a projection of the scene on an artificially flat landscape. Usually it takes more than one person to survey a crash scene; a helper holds the end of the tape and helps record measurements. The hand drawn sketches are not in a standard format making it very difficult to correlate multiple incidents, store the data, and transmit the data. Although the crash scene researchers are well trained, the number of manual operations in the measurement and analysis are a source of inefficiency and errors.

To improve its processing of these important data, the present invention will automate the process, and provide accurate, rapid, crash scene measurement, analysis, and documentation. The present invention will require only one documenter and provide for much faster scene measurement and documentation, which will minimize the labor cost. The present invention will maximize measurement accuracy while minimizing measurement errors by automatically recording precise Global Positioning System (GPS) measurements and providing step-by-step process prompts to the user. Unlike manual scene documentation, the measurements are made in a universal coordinate system that has well known transformations to local datums. This allows the absolute position of the scene to be located even where there are no reference landmarks such as in the desert, and provides for the possibility of recreating the scene in the future at the proper position and orientation. The data are three-dimensional allowing much more accurate scene documentation. Unlike the manual methods, the present invention automates the scene position and dimension calculations, as well as the scene drawing so that it provides, in near real-time, the accident scene report and accurate graphical representations of the scene. This reduces analysis errors, report preparation time, as well as providing a standard report format and data file format. The standard data file format will provide for electronic storage, retrieval, and transmission to facilitate data analysis and multiple incident correlations.

The present invention has a user-friendly interface, and provides for data and report security. To reduce training costs the user-friendly interface incorporates procedure prompts, and check for data entry errors and missing data. However, as much as possible, the Graphical User Interface (GUI) is based on the current procedures to minimize researcher retraining. The present invention is designed to be a low cost augmentation to a potable computer (palmtop or laptop).

Similar but much different systems based on GPS have been designed for construction and land surveying. These previous systems are designed to work over a much larger area than the instant device, and are more cumbersome to use. The present invention is tailored to crash scene and similar applications requiring accurate, local scene measurement and documentation. It makes use of unique processing and interface software to maximize efficiency and accuracy.

The present invention's processing software does not require determination of the unmeasurable GPS carrier phase cycles between the reference module and the measurement module using a solution space search strategy or statistical selection as prior systems require. As determining these cycles is the greatest cause of processing error in these systems, the present invention has greater solution integrity and accuracy over its smaller operational area.

The present invention's processing software has a unique configuration that provides enhanced solution integrity by combining an extended Kalman filter with a least-mean-square initialization and figure-of-merit determination process. The configuration provides for unique, robust measurement validation and selection, as well as position accuracy enhancement. It also provides an automatic means of recovery in case the Kalman Filter begins to diverge from the true solution.

The present invention's unique multimedia user interface provides process prompts and error checking tailored to the crash scene application. For instance, the automotive crash scene system conforms to the US Department of Transportation's Model Minimum Uniform Crash Criteria for scene documentation. The user is prompted to take all measurements and other data required by this standard, and the report produced conforms to the standard. To aid the single user, the present invention's prompts and instructions are given both graphically and audibly. The present invention also can be configured to respond to spoken commands instead of keystrokes to keep the user's hands free.

The previous systems make use of expensive proprietary hardware and software. The present invention leverages low cost, commercially available hardware, and commercial Computer Aided Drafting (CAD) and word processing software to provide enhanced functionality at about one twentieth the cost of the previous total solution, survey systems on the market.

Such an invention is needed by automotive, marine, and aircraft crash investigators because of it is more accurate, efficient, and standardized than the current manual systems. It requires less personnel, saving labor costs, and its instructive and error checking interface reduces training costs and enhances measurement integrity. It also can be produced at a low cost that allows more high quality, crash scene research to be performed on the same budgets, ultimately improving the safety of all modes of transportation.

SUMMARY OF THE INVENTION

The present invention consists of two modules, the measurement and reference modules. The measurement module is used by the scene surveyor to measure the crash element points while the reference module's GPS measurements are used to remove common errors from the measurement data.

The reference module has a portable computer, either a commercial-off-the-shelf (COTS) laptop, palmtop, or pen computer. A COTS GPS receiver board is either integrated in the computer package or packaged separately. It communicates with the receiver through a digital I/O port, most often a serial port. The computer contains the turn-key invention software that uses a Graphical User Interface (GUI) and audio to guide the user through a scene measurement. The software also controls the GPS receiver, collects the GPS data, processes the data, builds a Computer Aided Drafting (CAD) scene file, calls a COTS word processing program and writes a report, and calls a COTS CAD program to draw the scene. The GPS receiver requires a COTS antenna for receiving the GPS signals. In the present invention, the antenna is mounted on survey stake with a bubble plumb/level or electronic level sensor, and is placed on points whose positions define the relative shape, orientation, and size of the scene elements.

The reference module consists of a COTS GPS antenna and receiver integrated with a microcontroller board and power supply. The microcontroller controls the receiver and stores the GPS reference data. The reference module is placed for convenience. Normally, a silver dollar sized antenna with a magnetized bottom will be stuck to the roof of the surveyor's vehicle and the electronics are in the vehicle but the reference module could be placed anywhere near the crash scene.

The device can include optional equipment to enhance its capabilities. In some versions of the present invention, a COTS radio link between the reference and measurement modules will allow real-time scene dimensions to be calculated. A wireless Internet modem or a Cellular Digital Packet Data (CDPD) modem can be used to connect from the field to a central computer to send the completed documentation or retrieve needed data or assignments. Other optional equipment can include a COTS digital camera for pictures of the scene and a laser range finder. The low cost, laser range finder may be useful for measuring distances under overpasses or in tunnels where GPS satellite visibility is limited.

Using the present invention, a single surveyor can accurately and rapidly, measure and document a crash scene. To perform the crash scene measurements, the researcher powers up the pen or laptop computer, and initiates the turnkey software. The turnkey software features a user friendly, graphical interface that can provide step-by-step prompts, if the user desires. This software automatically will start a Built-In-Test (BIT) systems check, set up the GPS receiver, and initiate measurement collection.

The user will be prompted to initialize the crash scene record with a name, location designation, and any other general information desired. The researcher will be asked about the number and type of vehicles, vessels, or aircraft involved, and about other scene elements. Then they will measure the crash scene by walking to each point in the crash scene for which they want a measurement, and placing the survey antenna stake there for about five seconds. At each point, they will select a measurement type (car 1—right front corner; skid mark 1—start point; etc). The software will automatically record the GPS measurements for each point so no manual mistakes are possible. Each common, crash scene element will have a minimum number of points to be measured. If the researcher misses a measurement point or entire element, the software will remind him/her. The user will have the opportunity to annotate the scene record and scene elements before, during, and after the measurement process. Also, the user can modify, delete, or repeat a measurement during and after the measurement process. Upon completing the measurements, the processing and report software is initiated.

The reference measurements are either constantly collected from a radio link between the reference and measurement units or the user can connect the measurement computer to the reference module via standard computer I/O cable (RS-232, RS-422, parallel, USB, etc.) or infrared link. The reference measurements are automatically retrieved from the reference module and stored on the computer. Then the present invention's processing software will take the raw GPS data from both receivers and determine the relative position of each point to about centimeter accuracy, and angles between line segments to about a tenth of a radian accuracy. (Angular accuracy depends on the distance between points with better accuracy for widely separated points.) Each GPS measurement provides a three-dimensional position offset from the reference point (North, East, and Altitude; Latitude, Longitude, and Altitude; Earth Centered Earth Fixed (ECEF) x, y, z; etc.). Absolute position is improved by using a DGPS correction from a national DGPS system or by locating the reference unit at a geodetic marker.

The software of the present invention then automatically develops a CAD quality graphical representation of the scene by formatting a drawing file that can be used by a COTS CAD program. These graphical scene elements will be scalable to accurately represent the relative size and orientation of the actual scene elements. The graphic file of the crash scene will be digital so it can be readily stored, manipulated, and transmitted. It also could be developed as a three dimensional graphic that could be rotated to provide a view from any angle.

The software of the present invention will then call a COTS word processing program, and specify a report template from a preformatted library of the most common crash types. A generic report template also will be available for less common types of crashes. The scene data from the scene measurements and the researcher's input will automatically be entered in the proper fields of the report. The user then either accepts that report, augment it, or access a summary of the processed data and create a report to their tastes. If they elect to edit the automated report, they will have access to the full functionality of the word processor.

The present invention is engineered to cost an order of magnitude less than a general GPS survey system with the same accuracy level, which is not tailored to the applications identified above. Although the present invention will cost more than a manual survey (measuring tape and wheel), its efficiency and enhanced capabilities will produce savings that will quickly recoup the investment. The specifics of the application process are embedded in the user interface, which reduces training requirements, survey time, and report preparation time. With the present invention, scene measurement and documentation could be performed with little training in the mechanics of the scene survey. It also will increase productivity through enhanced report accuracy and integrity, and facilitating more efficient and productive analysis. The measurements are automatically recorded and the positions calculated relative to the reference point regardless of the measurement order. No line-of-sight is required between any points for the GPS measurements. The resulting data and documentation will be in electronic format for easy storage, transmittal, and analysis.

The measurement process can be very fast if required for the safety of the researcher or the convenience of the public. A crash scene consisting of two vehicles (12 points including deformation points), a set of skid marks (four points) and the absolute position (Lat., Long, Alt.) of the reference point will take approximately four minutes to measure. This duration includes fifteen seconds to walk between points so only a total of 80 seconds is spent actually at the points.

DETAILED DESCRIPTION OF THE INVENTION

Embodiments of the present invention are described in more detail with reference to the drawings.

The preferred embodiment consists of a unique integration of COTS hardware and software combined with custom designed user interface, data processing, communication, and control software to form the unique automated scene measurement and documentation system. Numerous applications are possible that require only a slight modification of the system design. The preferred embodiment is applicable to highway crash scenes, and its detailed specifications are presented below, divided into subsections for the hardware and software.

HARDWARE

Figure 1:
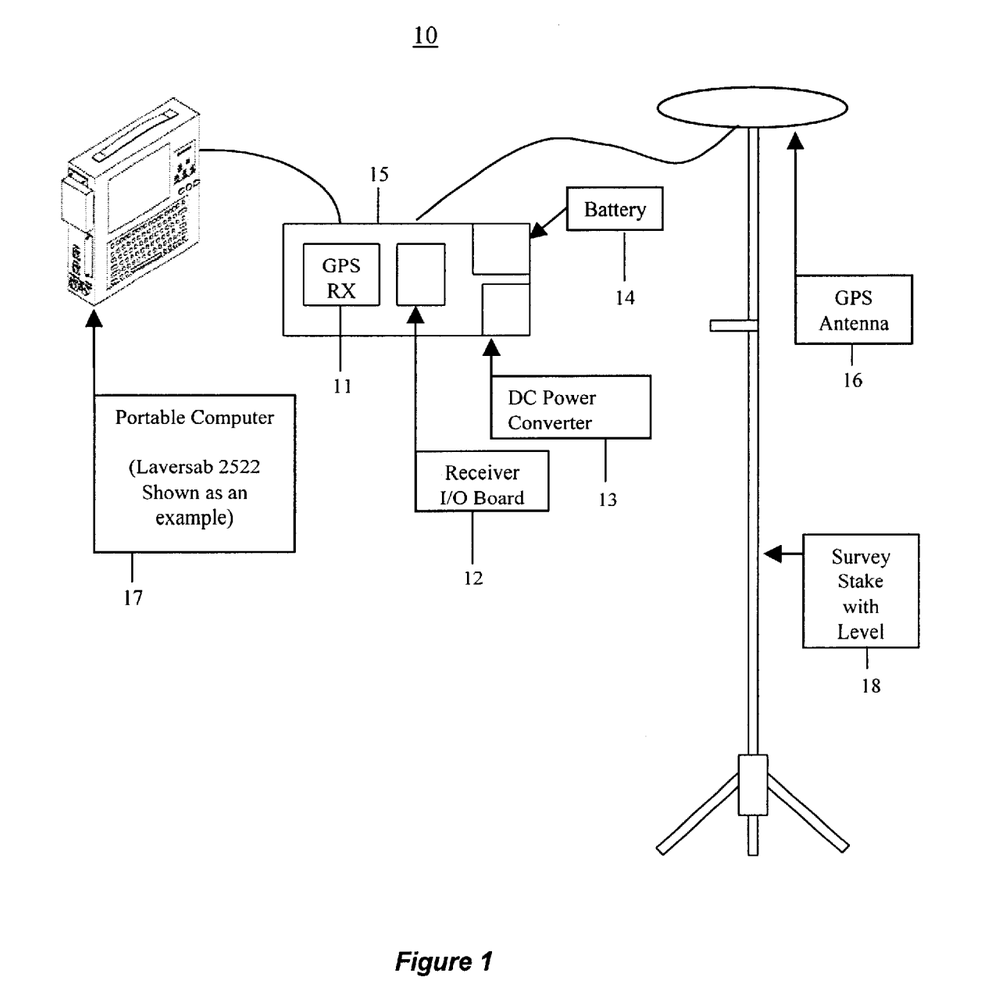
FIG. 1 illustrates the measurement unit of the preferred embodiment of the invention.
Figure 2:
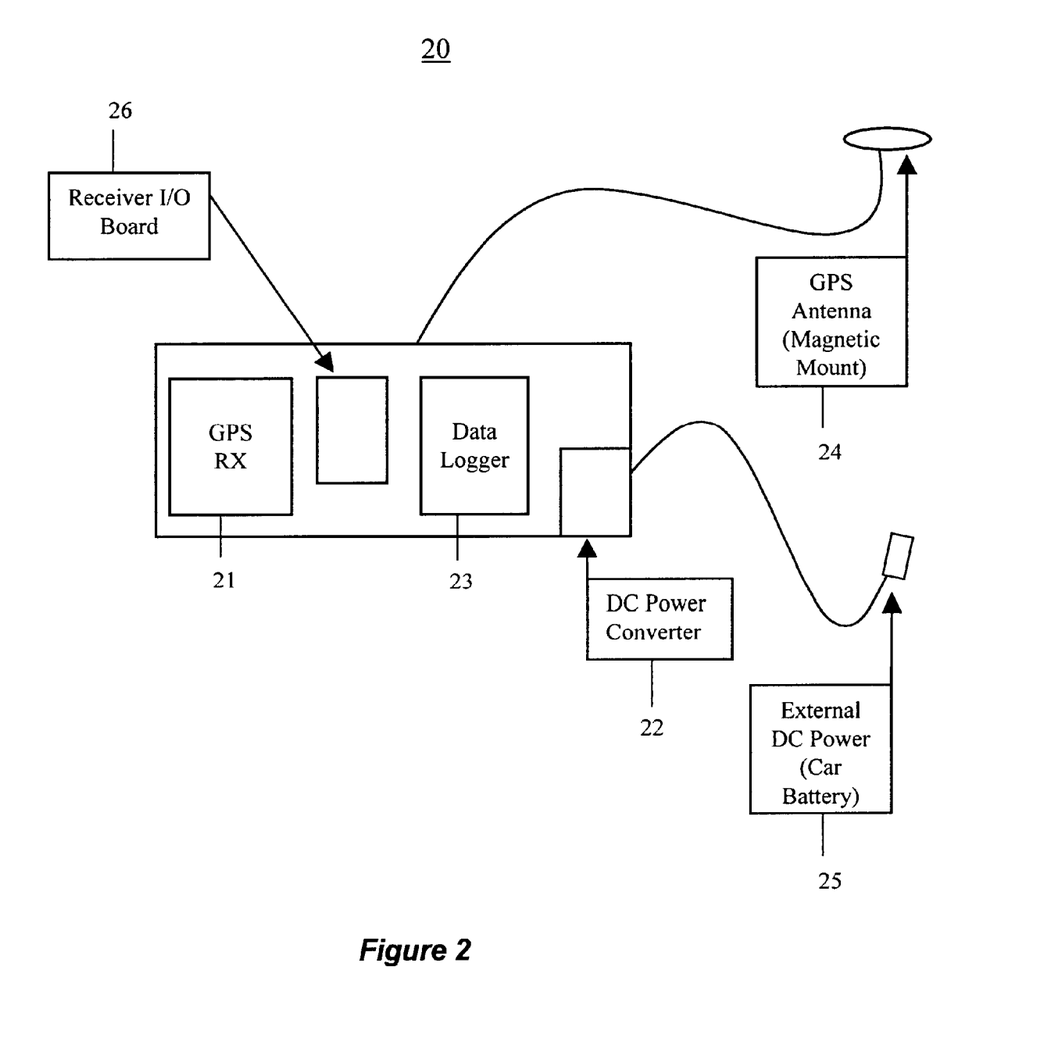
FIG. 2 illustrates the reference unit of the preferred embodiment of the invention.

FIGS. 1 and 2 illustrate the preferred embodiment having a measurement unit 10 and a reference unit 20, respectively. The reference unit's GPS measurements are required to remove the signal errors common to both receivers (i.e. electronic noise, atmospheric delay, SA).

Figure 3:
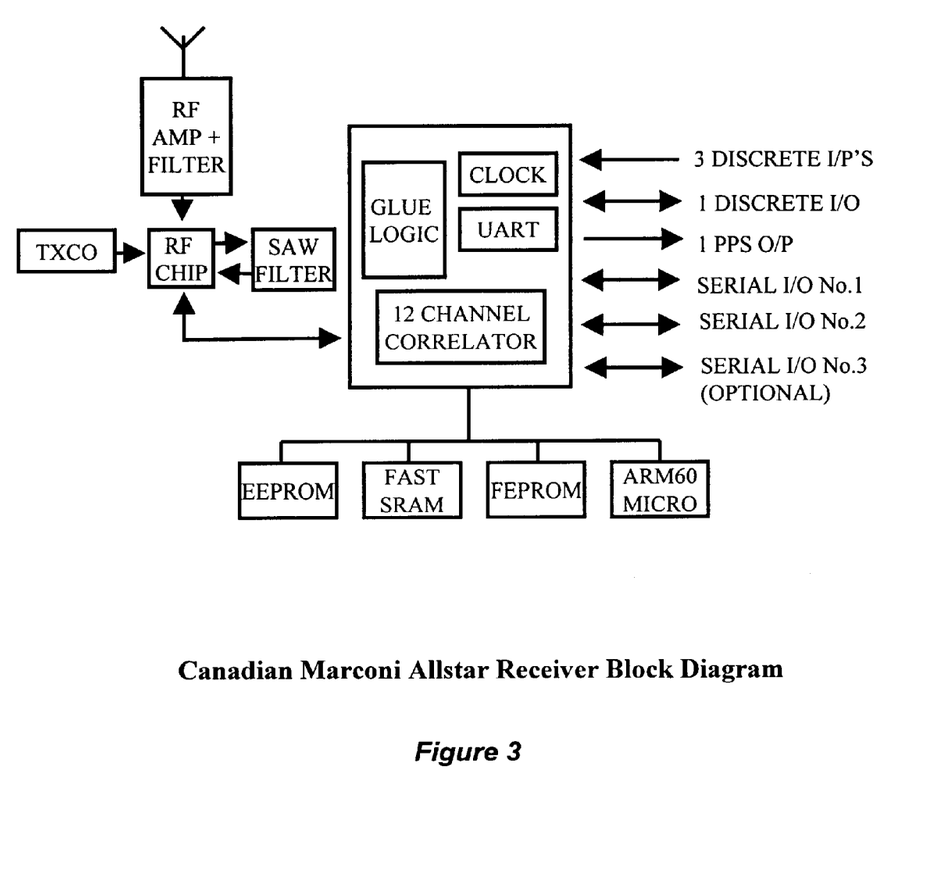
FIG. 3 illustrates a Canadian Marconi Allstar GPS receiver board, which is one of several COTS receiver boards presently on the market that can be used in the preferred embodiment of the invention.

Each of the units must have the same GPS receiver and antenna to most effectively eliminate the common errors. The receiver must have parallel tracking channels, and it must have a carrier, phase lock loop to accurately measure the fractional phase of the GPS carrier signal. FIG. 3 shows an example of a possible COTS receiver that may be used, the Canadian Marconi Allstar™. The Canadian Marconi Allstar single frequency (Li), C/A code, carrier phase, GPS receiver has twelve parallel tracking channels. It is 2.65"× 4.00"×0.55" and weighs 3.2 ounces. It is controlled and data is output at 1 Hz. through two RS-232 serial ports.

Measurement Unit

In FIG. 1, the measurement unit 10 consists of a GPS subsystem 15 and a computer subsystem 17. The measurement unit's GPS subsystem contains a GPS receiver 11 with a pole mount antenna 16, an I/O interface card 12, a DC/DC power converter 13, and a battery 14. The computer subsystem 17 could be a portable tablet, laptop, or palmtop computer. The measurement unit's subsystems may be housed in separate enclosures, with the GPS subsystem mounted on the operators waist or in a backpack, and the computer system held in hand, resting in a waist suspended tray, or attached to the antenna tripod. Alternatively, the antenna/receiver may come as an integrated unit only requiring a serial connection to the computer and power.

GPS Subsystem

As the user proceeds from point to point at an accident scene, GPS satellite signals arrive at the surveyor's antenna 16 (stake mounted). The GPS receiver 11 processes the satellite signals and transmits the raw measurement data to the computer subsystem 17 for processing. The receiver interface board 12 facilitates the proper signal level conversion from the GPS receiver's TTL interface to the computer system's RS-232 interface. Recorded data include GPS satellite numbers, pseudorange, carrier phase, ephemeris, time, signal strength, and cycle slip count. If packaged separately, the GPS receiver and I/O board will be in a waterproof enclosure along with a DC/DC converter and a battery GPS Receiver The GPS receiver 11 is central to the operation of the preferred embodiment. It provides raw GPS satellites' signal measurements to the survey software module on the computer subsystem 17. When combined with the measurements from the GPS receiver 21 in the Reference Unit 20 shown in FIG. 2, the processing software on the computer subsystem 17 generates relative positioning information for the accident scene data points.

GPS Antenna System

To conduct a proper accident scene survey, the operator must place the antenna 16 precisely at each significant data point (car corners, curb edges, landmarks, etc.). To facilitate this, the measurement unit will be equipped with a GPS antenna mounted on a survey stake 18.

The survey stake 18 will have a pointed end to assist in the precise placement of the antenna center, a threaded top for antenna attachment, and may have a height-adjusting lever. An integrated level sensor will allow the operator to orient the antenna perpendicular to the horizon, which maximizes satellite visibility (prevents masking due to antenna tilt) and assures alignment of the east and north component of the antenna position with that of the data point being measured. The vertical position is determined by subtracting the stake length along a vector constructed through the center of the earth. A small tripod with joints that bend would be attached to the base of the survey stake to assist the operator in antenna placement and stabilization.

Receiver I/O Board

The receiver I/O board 12 will facilitate the transmission of GPS measurement data and receiver control commands between the OEM GPS board and the computer subsystem. Specifically, it provides (if required for the particular COTS receiver or computer) the signal level conversion (TTL to RS-232) between the serial interface ports on the receiver and the computer. Other I/O board functions include the distribution of input DC power. The receiver I/O board 12 would be contained within the same enclosure as the receiver.

DC/DC Power Converter

A compact commercial DC/DC voltage converter 13 will be embedded with the receiver and I/O board enclosure. Other power converter protection mechanisms, which can be included are reverse polarity, short circuit, and over-voltage protection.

The DC/DC converter will be packaged within the measurement unit's OPS subsystem enclosure. If provisions are made to integrate the receiver and I/O board within the computer subsystem, the DC/DC converter may be bypassed (or not included) as the proper DC power may be available from within the computer.

Battery

A commercial battery 14 or other power supply means is required to operate the GPS subsystem if it cannot draw power directly from the portable computer. The battery may be contained within the same enclosure as the receiver, I/O board, and DC/DC converter or kept separate for easy swapping and recharging.

Enclosure

To facilitate adverse weather accident scene surveys, the GPS subsystem will be enclosed in a NEMA 4 (splash proof) enclosure. The operator will carry the enclosure in a backpack or a belt mount.

COMPUTER SUBSYSTEM

The portable computer will host the COTS and present invention software. Using that software, it will interact with the user, collect the GPS measurements from both GPS subsystems (measurement unit and reference unit), process the accident scene survey positions, generate CAD drawings of the scene, and integrate these drawings into a complete accident report.

The computer system 17 would be a portable tablet, laptop, or palmtop style PC compatible computer. To facilitate all of the processing functions of the preferred embodiment, the computer system should meet the following minimum general requirements:

1 RS-232 serial port (for GPS receiver interface)
  Integral VGA display, 64 k colors
  Pentium processor, 120 MHz (or equivalent)
  500 MB hard disk
  Audio capable (for user prompts, can be through PC or AT card)
  Keyboard/keypad
  CD-ROM drive (for loading software, not needed internally)
  32 MB RAM
  Internal battery operation for a minimum of 1 hour
  Spare battery or car chargeable
  Weight: <15 lbs.

The serial port facilitates the GPS receiver(s) interface. The display, keyboard, processor, RAM, hard drive, and CD-ROM facilitate the graphical user interface and perform the processing. Finally, the battery and weight requirement allow for portable operation.

Reference Unit

FIG. 2 illustrates the reference unit 20 consisting of a GPS subsystem and a data logging system. The reference unit contains a GPS receiver 21 with a magnetic mount (or tripod mount) patch antenna 24, an I/O interface card 26, DC/DC power converter 22, and a microcontroller board 23. All components will be housed in a single enclosure and will run off of an external DC power source 25 (car battery or portable battery).

The GPS receiver 21 used in the reference unit will be the same receiver as in the measurement unit in order to ensure that the measurement errors in the two subsystems will be as equal as possible so they will cancel during processing. The main difference between the measurement unit's and reference unit's GPS subsystems is the required output data. The measurement unit's GPS subsystem must output raw satellite observables and satellite ephemeris data, while the reference unit's GPS receiver is required to output raw satellite observables and PVT (position, velocity, and time) information.

Differing from the measurement unit's GPS antenna system, the reference unit's GPS antenna 24 must remain stationary during the entire survey (data collection period). To facilitate this, the reference unit will be equipped with a magnetic mount or tripod mount GPS antenna. It will typically be located on or near the operator's vehicle since the reference unit itself would be located in or near the same vehicle.

The reference unit GPS antenna 24 may have similar or identical operating characteristics (gain pattern, ground plane, pre-amp, etc.) to the measurement unit GPS antenna. This would assist in the removal of common mode GPS errors between the two receivers, which results in more accurate survey results. At the start of the survey, the measurement unit antenna will be placed at a close, fixed position relative to the reference antenna for a few seconds so that the integer carrier cycle difference between the reference and measurement antennas are known to be zero. A clamp attached to the base antenna/tripod may be used to ensure proper spacing.

The reference unit's GPS receiver I/O board 26 is identical to the I/O board used in the measurement unit. The DC/DC power converter 22 used in the reference unit similar to the one used in the measurement unit, differing only as required to power the microcontroller. A single generic metal or plastic enclosure may be used to house the receiver, I/O, power, and data logging electronics.

The reference unit only needs a low-cost data-logger instead of a full powered laptop computer. A COTS microcontroller board 23 is used as the data-logger. This microcontroller logger may be packaged with the reference unit's receiver, I/O board, and DC/DC power converter. The general requirements for the data logger are listed below along with an example microcontroller.

The data-logger must be able to serially interface with the reference receiver (data collection and receiver control) and the measurement unit laptop computer (data off-loading). It must contain enough Random Access Memory (RAM) to hold all reference receiver GPS data collected during the crash scene survey, approximately 460 KB for 9 continuously tracked satellites.

User interface functions are performed using programmable I/O in conjunction with individual switches and LEDs. Interface requirements include the ability for the user to start and stop data logging, send pre-stored commands to the receiver, and off-load the stored data to another computer.

An example of the data-logging microcontroller is the ZWorld BL 1600. This system measures 4.52"×4.175"×1.0" and is based on the Zilog Z180 microcontroller operating at 9.216 MHz. It supports up to 512 KB of SRAM and up 256 KB of flash EPROM. It has numerous digital I/O lines, two RS-232 ports, and an on-board linear voltage regulator that accepts input from 9–24 VDC. Application software is developed using Dynamic C™.

The preferred embodiment could be employed in a crash scene, documentation system for local law enforcement, military police, transportation departments, and personal injury lawyers. The present invention also can be readily adapted to document other types of transportation crashes including aviation, train, and vessel by modifying the GUI, CAD symbols, and report format. Also, police may be interested in using the system for documenting outdoor crime scenes. In addition, the present invention could provide a low cost way of verifying property lines and right-of-ways without the expense and delay of a professional survey. A derivative of the present invention with a different GUI, CAD symbols, and report format could be used for archeological mapping of such things as building foundations, city walls, fortifications, and artifact locations. The present invention also could have applications in forestry, botany, zoological, and agriculture research where the spatial distribution of species is of interest.

With a radio link between the measurement and reference receiver, the present invention could be used for quickly laying out ball fields (including decorative designs), large gardens, landscape patterns, as well as parking lot, airfield, port, and roadway markings. The design to be surveyed onto the surface could be from a CAD program, a scanned survey plat, or created using another drawing program. The real-time system would guide the user to points that when marked, provide the desired full size outline.

Software

Figure 4:
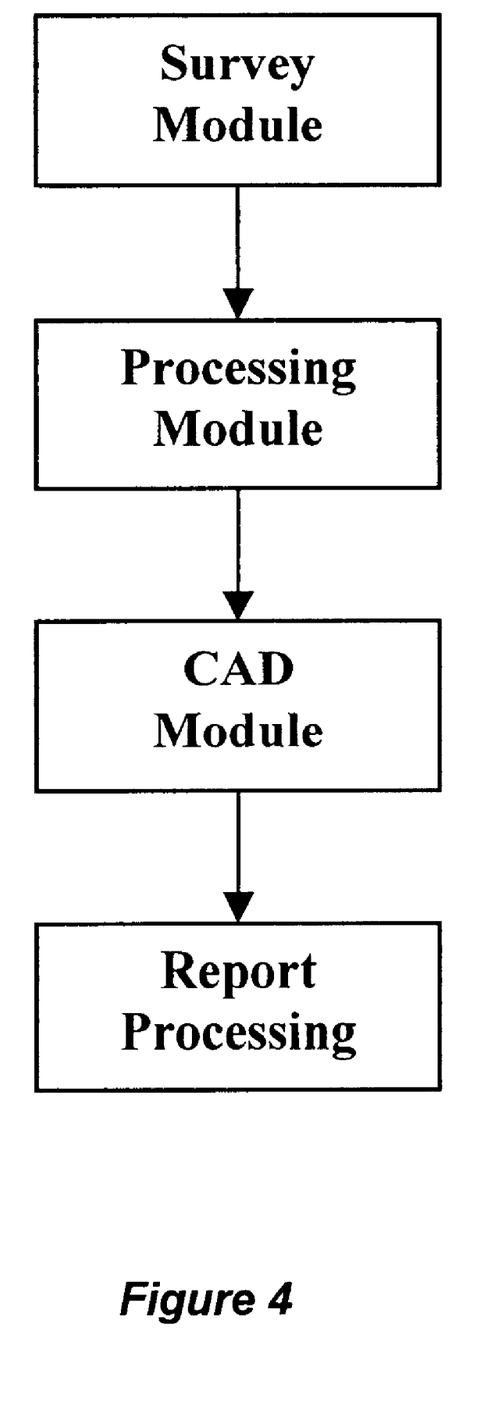
FIG. 4 illustrates a software flowchart that provides an overview of the preferred embodiment of the invention.

FIG. 4 shows the four modules of software required for the present invention. These modules are the survey, the processing, the CAD drawing, and the report modules. The survey module includes the software to initialize and control the GPS receiver, interface with the user, and collect and store the measurement data. The processing module performs calculations on the GPS data to obtain the coordinate's of each point surveyed, distances between points, and angles between surfaces. The CAD drawing module uses the processed data to construct a CAD style drawing of the scene. The report module transfers the data into a written report of the accident scene. The following subsections discuss each of these modules.

Survey Module

The survey module includes the receiver interface software, the GUIs, and the measurement recording function. For the reference unit, only the receiver interface and raw data storage process are required. The optional laser range finder interface sub-module is included in the design.

The receiver interface module will initialize the receivers by selecting the operating mode, output messages, and other options. It also collects, validates, and parses the raw data; and responds to receiver error messages. Additional specifications for this module include receiver BIT and error handling processes. Separate storage structures are included in the design for measurements made with the optional laser range finder and made manually. This module also will provide the control interface to the laser range finder.

The measurement process defined by the sequence of GUI screens will proceed in the following way. The software would be started through an icon on the computer screen or through the start menu. The user interface will incorporate a BIT routine that executes when the program loads and error handling routines that will alert the user graphically and audibly, to receiver and computer malfunctions, data corruption, low battery, and low disk space. Direct access to the GPS receiver through the software will not be provided because the system is designed for users that are not experts in the GPS. However, the present invention would provide a separate software utility that allows the user to command the receiver by selecting from a menu and graphically observe the position, velocity, and time output. The user also can request any particular output message, including receiver BIT results and status, and save it to a file for analysis.

Upon a normal program start, the user will be presented with a screen with a Windows™ type tool bar, and prompted to select between starting a new measurement file, or processing or editing a previous file. The choice to start a new file will bring up a screen that will prompt the user to select a reference point and initiate the reference unit. Then the GUI prompts the user to assign a file name, enter descriptive text, categorize the weather, and choose the number and types of vehicles involved. In addition, the user will specify data from a menu about the roadway including whether the crash happened at an intersection, straight, or curved road. The user will assign names to each roadway and check the correct option for the number of lanes and road type. Then the user will be prompted to select the crash scene elements to be measured, other than the vehicles, from a list of icons.

The GUI will proceed to prompt the user to place the antenna at the required number of points for each vehicle and element selected. The user will click the computer pointing device or hit the enter key to start each measurement. At the end of the required measurement duration, probably five seconds, the program will sound an audible tone, a visual indication, and prompt the user to the next point. Each measurement will be assigned to the proper element file by recording the start and stop GPS time of each measurement. Alternate designs of the device may use voice recognition software for user input instead of mouse or keystrokes.

During the measurement process, a quadrant of the GUI will display information about the expected measurement quality. A green, yellow, red color code, as well as the numerical HDOP, will be used to inform the user about the measurement quality. The absolute position (lat., long., alt.), GPS time, and local time will be displayed.

When all the previously entered vehicles and elements have been measured, the user will be given the option to add other elements, delete elements and measurements, or to end the measurement process. The program will alert the user if they try to end the process before all the specified elements have been measured completely.

The user next would be prompted to connect the reference unit's serial port to the pen computer's serial port and begin the data transfer. Upon completing the transfer, the user is prompted to disconnect the reference unit. Then they are asked if they want to start data processing or store the data for later processing.

During data processing, the user will see a screen stating that processing is proceeding normally. It will show the number of points processed and remaining. When the measurements have been processed, the user will be given the option to proceed to developing the documentation or stop and save the processed data.

When the documentation process is begun, the CAD program will be called. It will scale each of the elements according to the measurement file and produce the drawing of the scene on the screen. The user then will be given the option of annotating the scene and attaching the digital pictures to scene elements. Upon accepting the drawing, it will be stored and the word processor started to produce the report. The user will be able to view and modify the standard report before it is saved. When the report file is saved, the user will be taken back to the first screen to allow them to exit or begin another measurement.

The optional laser range finder interface sub-module can control the laser operation and receive the range data. The laser data will be stored in a separate file. That storage file will contain an index to the scene element point associated with each measurement.

An optional digital camera interface sub-module can be used to interface to an external camera or to one built into the computer. Pictures can be stored and attached to the report.

Processing Module

Figure 5:
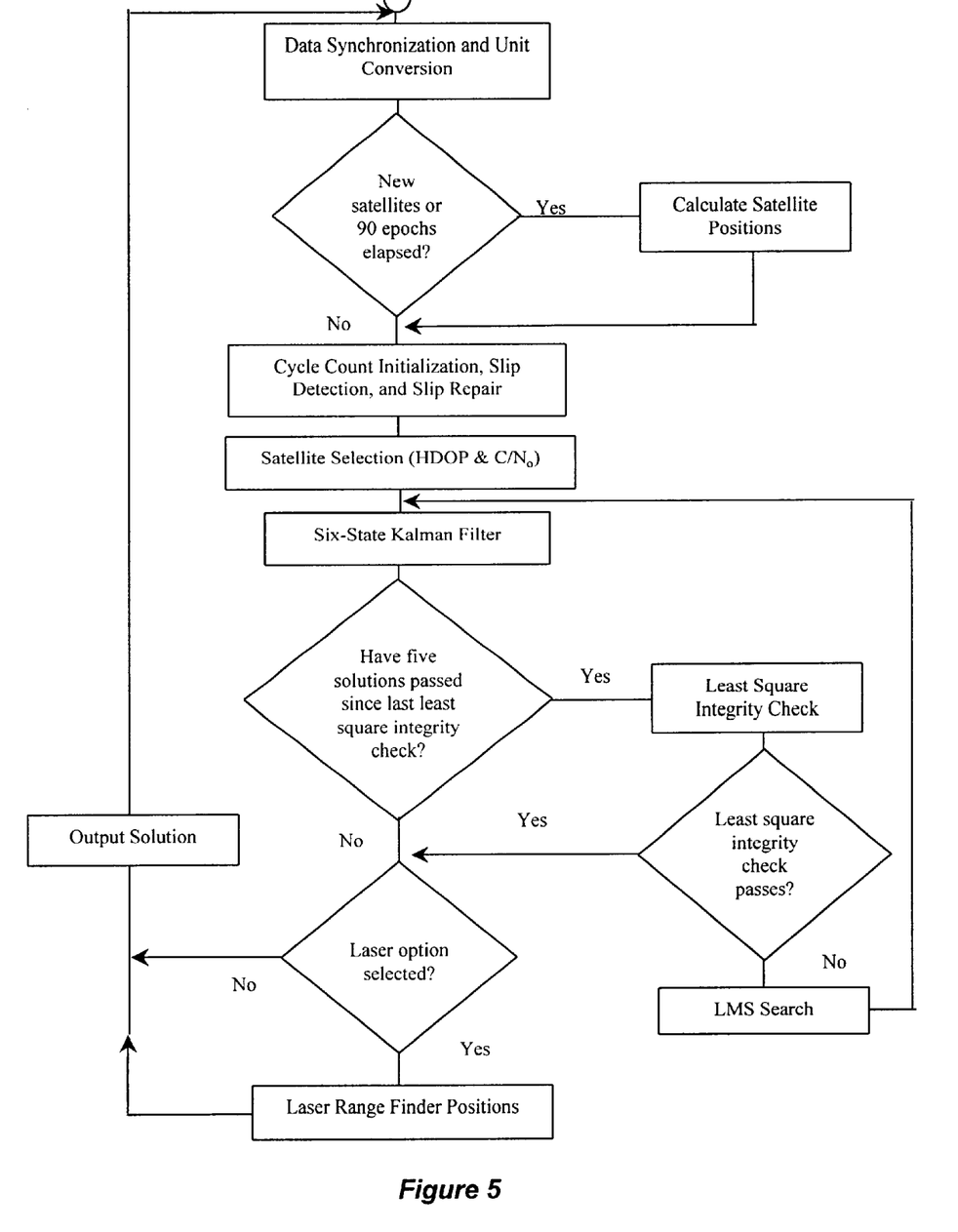
FIG. 5 illustrates a software flowchart of the processing module.

The heart of the Processing Module is a six-state, extended Kalman filter that determines the three-dimensional vector between the antennas, as well as the velocity of each of the vector components. The sophisticated filter is supported by various other sub-modules that perform the routine tasks including unit conversion, satellite position calculation, integrity checking, matrix algebra, satellite selection etc. The detail of the Kalman Filter design follows this overview of the software. FIG. 5 shows a flow chart of these sub-modules in the processing software.

The GPS measurements will be stored in two files, one for each receiver. Each measurement record is indexed by GPS time. When the processing software is initiated, the files will be scanned for the first and last record that has a corresponding time in the other file. With the files synchronized, the data are read and, where required, converted to different units for processing. During the data read, a file listing the satellites tracked by both receivers at each epoch is compiled. Some GPS receivers do not provide satellite positions in ECEF coordinates as required by the processing equations. The ephemeris message of each satellite must be used to calculate the position from the GPS modified, classical orbital parameters. This calculation must be done for each new satellite, and updated for existing satellites each ninety seconds.

The next sub-module scans the carrier phase measurements and the receiver measurement quality codes for cycle slips. To ensure solution integrity, every measurement will be checked before it is used.

Cycle slips only occur on one or two satellites at a time (if it happens at all). This allows the slips to be detected by comparing the magnitude and direction of the differential phase change for each satellite. If a cycle slip is detected, it can be repaired by determining from the other satellites the approximate magnitude and direction of the differential phase change that should have been measured. The system is only looking for corrections to the whole cycle count so the estimate only needs to be within about 10 centimeters. The correct count is then written to the file. This procedure also is used to initialize the whole cycle counts for satellites that rise during the measurement process. Equation 6 specifies the integer determination algorithm used after the approximate vector offset has been determined.

$$N_i = \text{Int}\left\{ \frac{1}{\lambda_{L1}} \left[ e_i \cdot \begin{bmatrix} \Delta X \\ \Delta Y \\ \Delta Z \end{bmatrix} - \Delta \phi_i \right] \right\} \quad [\text{Eq. 6}]$$

where $e_i$=Unit vector from reference antenna to satellite i $\Delta \phi$=Single difference phase measurement for satellite i with the last known good cycle count Int=Rounding to nearest integer $N_i$=Integer cycle count Eliminating satellites that have characteristics that make for less accurate solutions significantly increases the system performance. Degraded solutions can be the result of weak signals, multipath, and poor constellation geometry. The preferred embodiment of the invention therefore has a sub-module to check each satellite measurement for these characteristics so they will not be used in the solution, increasing system accuracy and integrity. An algorithm that rejects measurements of signals that are below a floor $C/N_o$ (signal strength) that is specific to the receivers used is implemented in the device.

The satellites chosen for use in the solution will be evaluated for the quality of the geometry between them and the measurement antenna. The base satellite chosen for the double differences should be the highest satellite in elevation above the horizon. A standard Figure Of Merit (FOM) for evaluating the satellites' geometry for horizontal positioning. is called Horizontal Dilution of Percision (HDOP). The preferred embodiment of the invention will use the well known HDOP algorithms to evaluate all the satellites in view in all possible combinations to determine the best base set of four satellites that will be used for the position solution. This base set, guaranteeing good geometry, will be augmented by any other available satellites that do not have detrimental characteristics.

Multipath, the reception of signals reflected off objects in the receiving antenna's environment, is a major phase error source. The height of the antenna stake will minimize the potential for signals to be reflected down into the antenna. However, signals incident at grazing angles can be distorted by the antenna structure and degrade the measurement. These grazing signals come from low elevation satellites. To prevent this, the preferred embodiment of the invention will check and not use satellites below ten degrees elevation above the horizon.

Once the satellites to be used for the measurement epoch are selected, the correct cycle count is added to the fractional phase measured for each new satellite then input to the Kalman Filter. The Kalman filter output is checked at regular intervals for integrity. The integrity monitor uses a Least Mean Square (LMS) search of a random selection of points in the solution space while storing the residuals. (Residuals are the LMS difference between modeled carrier phase for a trial solution and the actual carrier. phase measured.) This provides a base residual level for the entire solution space. The Kalman Filter solution also is put through the same LMS algorithms to calculate its measurement residual. The ratio of the average solution space residual to the Kalman Filter solution should be a factor of two or more to ensure confidence in the solution.

If the integrity check fails to achieve this ratio, a full LMS search is initiated, centered at the last known good point, to determine if a better solution is attainable. If one is found, it is used to reinitialize the Kalman Filter. This combination of two independent solution methods verifying the solution accuracy prevents divergence of the Extended Kalman Filter. The result is a unique, sophisticated, robust, high integrity, element position determining process for the preferred embodiment of the invention.

The last process in this sub-module formats the scene element, position points into a CAD data file. Each file record designates which pre-developed graphical symbol to use with a set of GPS determined dimensions. The dimensions are used by the CAD software to scale each element in the scene to realistic proportions.

CAD Module

A COTS CAD software program will be used to produce a high quality scene drawing automatically. The symbols to be used are complete and compatible with the Model Minimum Uniform Crash Criteria (MMUCC) endorsed by the National Highway Traffic Safety Administration (NHTSA). The output drawing file can be saved in a number of graphical formats (BMP/DIB, CGM, EPS/AI, IGES, PCX, GIF, JPEG, HTML, and DWG/DXF).

The input data to the program will consist of a file containing the element labels, dimensions, and positions. The device program will use Object Linking and Embedding (OLE) technology to initiate the drawing. The output will be a drawing file that can be imported into most documents. The drawing also can be printed directly from the COTS program if the portable computer is connected to a printer.

The preferred embodiment of the invention's software will seamlessly transition between COTS software and custom developed software. This will be accomplished through the use of OLE. OLE is a 10-year-old Microsoft technology developed solely for allowing Windows applications to talk to each other. OLE enabled applications expose certain functions and properties that can be accessed by any other OLE-enabled application. In this manner, programs can share features and transform themselves into super applications.

Applications that support OLE automation can be launched and controlled from within custom developed software applications through the use of an OLE client. Software programming languages such as Visual Basic and C++/C provide OLE objects and classes facilitating easy development of OLE enabled applications. By using OLE, the device GUI module can automatically launch the COTS CAD application and create a crash scene drawing using the processed GPS measurement data. The GUI module also can automatically launch a word processor application with a selected report template, and pre-fill report fields using data entered by a user and processed GPS measurement data.

Report Module

The report module will use a COTS word processor controlled by the custom device software. Standard format reports will be created using pre-defined templates. The program can be controlled and the report created using OLE just as described for the CAD function. The CAD drawing can be easily imported. In addition, digital pictures can be attached to hyperlinks in the file so that during later analysis the researcher can click on the hyperlinked scene element to call up a picture of it. The user also can edit the report or create their own version using the full functionality of the word processor.

KALMAN FILTER DESIGN

This section begins with an introduction to kinematic DGPS techniques by specifying the form of the basic algorithms. It contains the derivation of the equations relating differential carrier phase with the vector (3-d distance offset) between the reference and measurement antennas. It also specifies the GPS ECEF to local North, East, and Up (NEU) coordinate transformation. The Kalman Filter design subsection builds on these introductory equations to specify all the filter matrices and algorithms.

Introduction To Kinematic DGPS Equations

Figure 6:
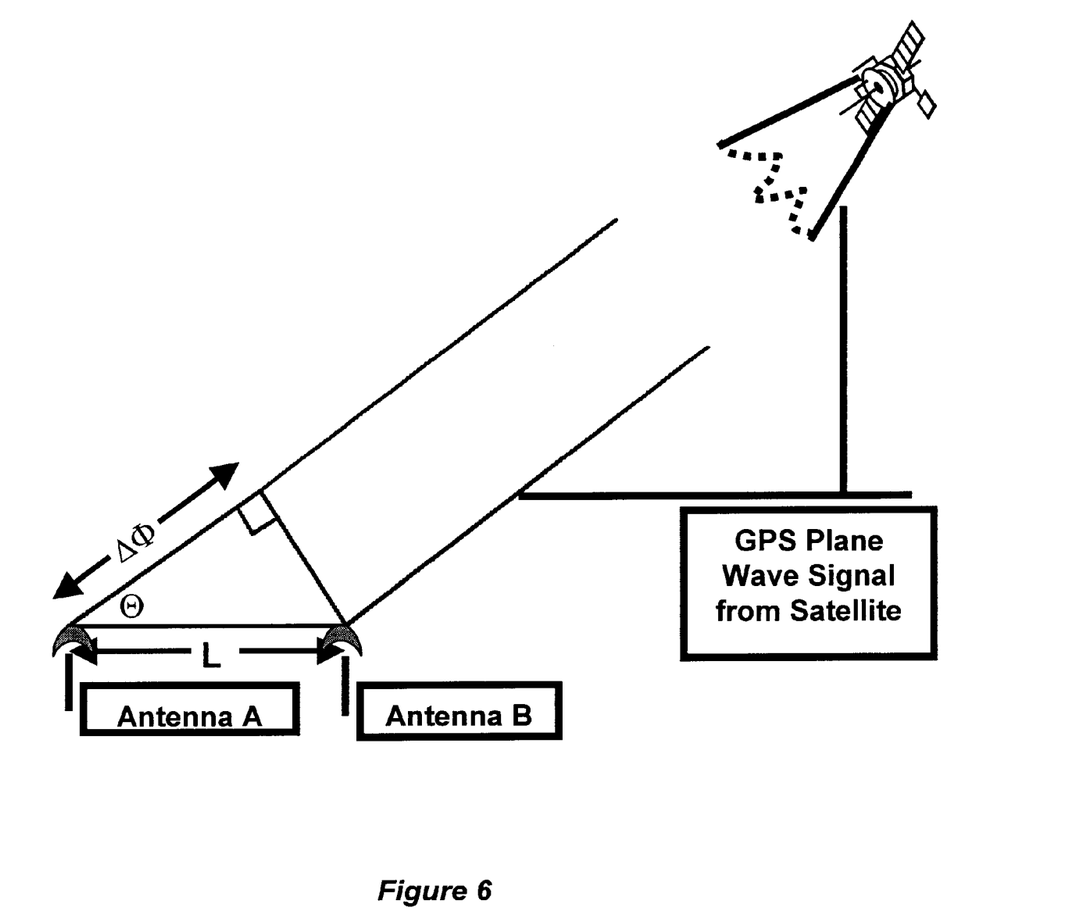
FIG. 6 illustrates a simplified carrier phase and baseline length relationship.

Before specifying the Kalman Filter design, it is helpful to review the origin of the algorithmic relationships modeled in the filter. FIG. 6 shows a simplified picture of how the differential carrier phase relates to the distance between the two receivers' antenna (baseline length). Equation 1 codifies this relationship. The angle to the satellite ($\theta$) is known from the broadcast satellite position and the normally determined GPS antenna position. Therefore, we can solve for the baseline length by determining the difference in carrier phase ($\Delta\phi$) between the two antennas if they are separated by less than a whole wavelength. However, for longer baselines we do not know the number of whole cycles between the antennas unless we placed the two antennas together and began kinematic carrier tracking before walking them apart to the positions shown in the figure. These unknown cycles are explicitly accounted for in the more accurate Equation 2.

$$\frac{\Delta\phi}{\cos\theta} = L \qquad [\text{Eq. 1}]$$

$$\frac{\Delta\phi + N\lambda_{L1}}{\cos\theta} = L \qquad [\text{Eq. 2}]$$

where
- $\Delta\phi$=Fractional carrier phase difference between antennas A & B (meters)
- L=Baseline length (meters)
- $\Gamma$=Angle between baseline vector and satellite signal incident angle (degrees or radians)
- N=Whole carrier cycles
- $\lambda_{L1}$=L1 wavelength (0.1904 meter)

Figure 7:
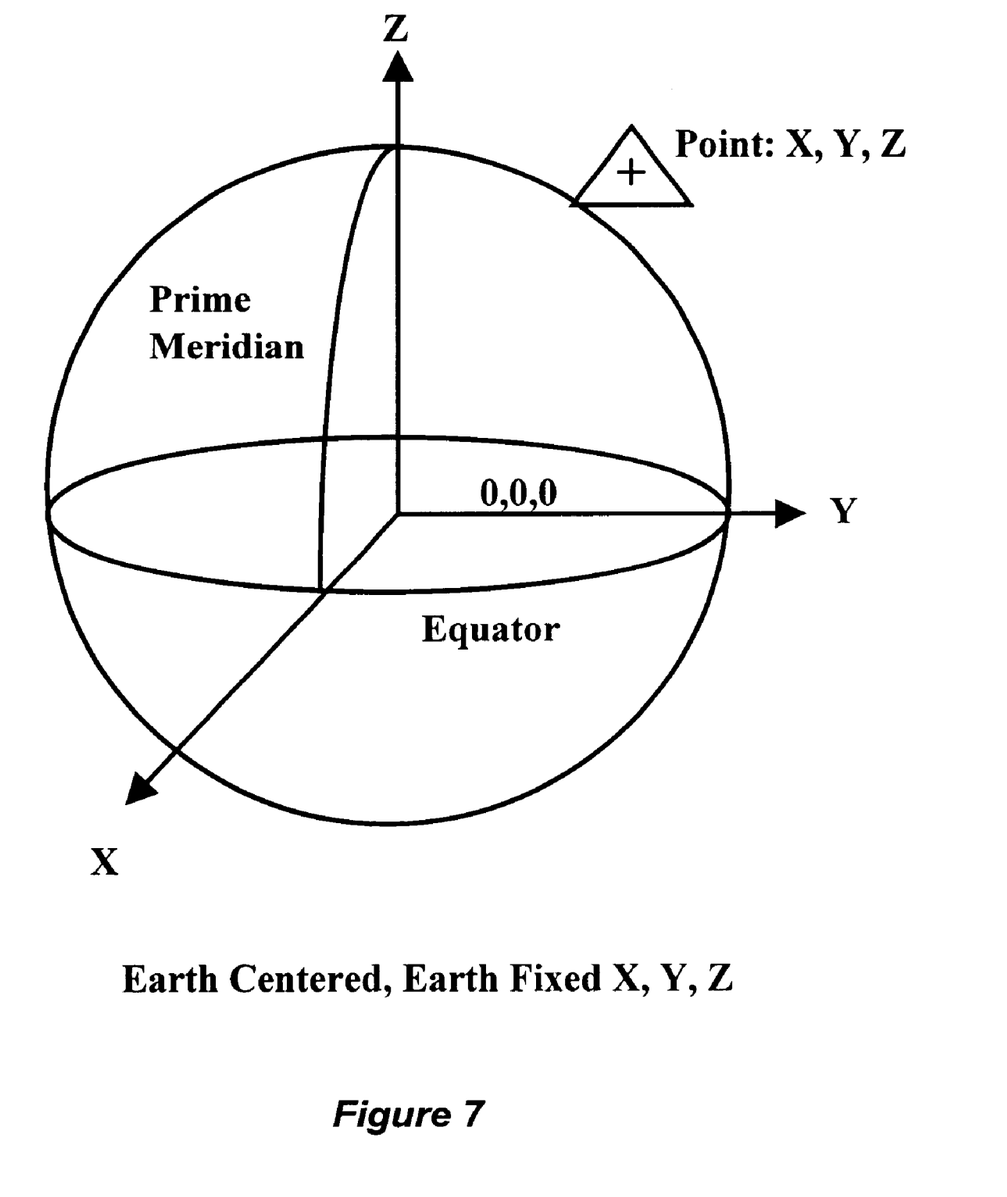
FIG. 7 illustrates a GPS Earth Centered Earth Fixed (ECEF) coordinate system.

The GPS uses the Earth Centered Earth Fixed (ECEF) coordinates system pictured in FIG. 7. The origin is the center of the earth. The positive Z-axis extends through the North Pole (true) and the positive X-axis extends at the equator through the Greenwich Meridian (0° longitude). The positive Y-axis extends through the equator at 90° longitude, East. This system is fixed because as the earth rotates under the satellites, the coordinate system rotates to maintain a fixed relationship with the latitude and longitude grid.

The basic equation relating the difference in carrier-phase between the antennas to the vector between the antennas (single baseline) is Equation 3. The three-dimensional distance between the antennas (baseline vector) is expressed in the GPS ECEF coordinates ($\Delta x$, $\Delta y$, $\Delta z$). In a single difference formulation as Equation 3 is, there are still confounding error terms that cannot be separated out. To get rid of these terms, another difference is performed between a satellite chosen as the base measurement (usually the highest elevation) and the other satellites common to both antennas. The double differenced (DD) Equation 4 is free of common error mechanisms at the satellites and receivers. There is still an error term that represents the differential residual of multipath, antenna phase center migration, and time varying receiver clock offsets. In addition, the differenced integer cycles ($N_{ij}$) are unknown. However, if the tracking starts when the antennas are close together (<0.1 meter) as in the preferred embodiment of the invention's measurement procedure, there is not room for any integer cycles so this term goes to zero.

$$\Delta\phi_i = e_i \cdot \begin{bmatrix} \Delta x \\ \Delta y \\ \Delta z \end{bmatrix} - N_i\lambda_{L1} + \varepsilon_C + \varepsilon_V \qquad [\text{Eq. 3}]$$

$$\begin{bmatrix} \Delta\nabla\phi_{1B} \\ \Delta\nabla\phi_{2B} \\ \vdots \\ \Delta\nabla\phi_{nB} \end{bmatrix} = \begin{bmatrix} e_1 - e_B \\ e_2 - e_B \\ \vdots \\ e_n - e_B \end{bmatrix} \cdot \begin{bmatrix} \Delta x \\ \Delta y \\ \Delta z \end{bmatrix} + \begin{bmatrix} N_{1B} \\ N_{2B} \\ \vdots \\ N_{nB} \end{bmatrix} + e_V \qquad [\text{Eq. 4}]$$

where
- $\Delta\phi_i$=Measured fractional differential phase . . . single difference between antennas for satellite i
- $e_i$=3×1 unit vector (ECEF) from the primary antenna to satellite i
- $N_i$=Unmeasurable integer carrier cycle ambiguity for satellite i
- $\lambda_{L1}$=L1 carrier wavelength (0.1904 meters)
- $\epsilon_C$=Errors constant over epoch, lumped (constant clockoffset, phase center migration)
- $\epsilon_V$=Errors that vary during measurement epoh & and between the antennas
- $\Delta\nabla\phi_{iB}$=Double differenced, between satellites i & the chosen base satellite B, fractional phase measureme $N_{ij}$=Difference between integer cycles of satellites i & j (zero for baselines <0.5$\lambda_{L1}$)

Equation 4 is the primary kinematic, DGPS equation. Its form will be the basis for the Kalman Filter system model. The solution to this equation is an ECEF vector between the antennas. To represent the immediate area around the crash scene in form useable with local road maps, the device needs the solution relative to a local coordinate system centered at the reference antenna's longitude, latitude, and altitude. A local East, North, and Up (ENU) system can be defined with the matrix C providing the transformation as indicated in Equation 5.

$$\begin{bmatrix} E \\ N \\ U \end{bmatrix} = C \cdot \begin{bmatrix} x \\ y \\ z \\ 1 \end{bmatrix} \quad [\text{Eq. 5}]$$

$$C = \begin{bmatrix} -\sin\alpha & \cos\alpha & 0 & x_r\sin\alpha - y_r\cos\alpha \\ -\sin\beta\cos\alpha & -\sin\beta\sin\alpha & \cos\beta & x_r\sin\beta\cos\alpha + y_r\sin\beta\sin\alpha - z_r\cos\beta \\ \cos\beta\cos\alpha & \cos\beta\sin\alpha & \sin\beta & -x_r\cos\beta\cos\alpha - y_r\cos\beta\sin\alpha - z_r\sin\beta \end{bmatrix}$$

where

α=Longitude of reference antenna

β=Latitude of reference antenna $x_r, y_r, z_r$=ECEF position of reference antenna x,y,z=ECEF position of measurement antenna E, N, U=Local North, East, Up position of measurement antenna Kalman Filter Specifications A Kalman filter is not really a filter in the classical electronic circuits sense. It is more of an application of Optimal Control Theory and Random Signal Probability. The two main features of Kalman's formulation and solution are:

Vector modeling of the random processes in the system

Recursive processing of noisy measurement data.

A Kalman filter formulation is used because of its ability to determine an accurate solution embedded in noise. Although a standard procedure is used to solve for and propagate a solution in Kalman Filtering, the system model equations must be customized for every application. Modeling the system and noise, and previsions to prevent solution divergence are unique and custom for the preferred embodiment of the invention.

The Kalman filter technique requires that the system be linear and capable of being modeled as two equations (Equations K1 and K2). The first equation specifies how the system gets from the current state to its state at the next time epoch. The second equation specifies the relationship between the current system state and the measurements. Both equations include vector noise models.

$$x_{K+1} = \phi_K x_K + w_K \quad [\text{Eq. K1}]$$

$$z_K = H_K x_K + v_K \quad [\text{Eq. K2}]$$

where $x_k$=State Vector at epoch $t_k$ $\phi_K$=State Transition Matrix (STM)

$w_K$=White process noise with known covariance $z_K$=Vector measurement at time $t_K$ $H_K$=Ideal, noiseless matrix connects the system state and the measurement at epoch $t_K$ $v_K$=Measurement error vector, white with known covariance The system state vector $x_k$ contains the components of the ECEF vector between antennas that we are solving for, as well as the velocity (rate of change) of each vector component. It is shown below as Equation K3.

$$x_K = \begin{bmatrix} \Delta X \\ \vdots \\ \Delta \dot X \\ \Delta Y \\ \vdots \\ \Delta \dot Y \\ \Delta Z \\ \vdots \\ \Delta \dot Z \end{bmatrix} \quad [\text{Eq. K3}]$$

where

ΔX,ΔY,ΔZ=3-dimensional ECEF vector-reference antenna to measurement antenna (meters)

Δ˙X=Rate of change(velocity) of the X axis component of the vector between antennnas (meters/sec)

Δ˙Y=Rate of change(velocity) of the Y axis component of the vector between antennnas (meters/sec)

Δ˙Z=Rate of change(velocity) of the Z axis component of the vector between antennnas (meters/sec)

The State Transition Matrix $\phi_K$ (STM) defines how the system model relates the current state to the state at the next epoch. For the device, we are modeling the transition as a constant rate. Equation K4 is the STM for the device.

$$\phi_K = \begin{bmatrix} 1 & \Delta t & 0 & 0 & 0 & 0 \\ 0 & 1 & 0 & 0 & 0 & 0 \\ 0 & 0 & 1 & \Delta t & 0 & 0 \\ 0 & 0 & 0 & 1 & 0 & 0 \\ 0 & 0 & 0 & 0 & 1 & \Delta t \\ 0 & 0 & 0 & 0 & 0 & 1 \end{bmatrix} \quad [\text{Eq. K4}]$$

Equations K1 and K2 are used to codify the Kalman filter model, and are not used directly in the Kalman filter mechanism. However, the matrices and vectors that are used in the mechanism equations are derived from the elements of the model in Equations K1 and K2. The State Vector and the STM are taken directly from these equations.

The Kalman filter mechanism is a set of recursive, matrix algorithms that predict the state vector and the error covariance matrix for the next epoch. Then at the next epoch, it evaluates and modifies those state and error covariance predictions based on the new measurements. The modified state vector is the output (solution) at that epoch. It then makes a prediction of the state vector and error covariance matrix at the next measurement epoch and so on ad infinitum.

The Kalman filter requires a linear model. As the relationship between the state and the measurement vectors is non-linear for the device, the equations must be linearized about a nominal trajectory. The initial trajectory point for the preferred embodiment of the invention's filter will be a fixed, vector offset that is less than half a carrier wavelength to ensure that there are no integer cycles in the offset vector to resolve. The predicted solution from the last epoch will be used for the subsequent epochs. This model requires a version of filter called an extended Kalman filter.

Extended Kalman filters have been used successfully in many applications including GPS positioning. However, the designer must consider that an extended Kalman filter can diverge from the solution. Appropriate safe guards must be implemented to prevent this and to handle it if it does happen. The inventors have done this by ensuring that the filter initialization point is a very good estimate that should cause the filter to converge every time. Also, the design has an independent monitoring scheme using a LS search that will detect filter divergence, and reinitialize it before it reaches an unacceptable level. The resulting preferred embodiment of the invention's software design will produce an accurate, stable system with high integrity.

The recursive equations for the extended Kalman filter are presented below. The Prediction $$x_{K+1}^{(-)} = \phi_K x_K^{(+)} \quad [\text{Eq. K5}]$$

$$P_{K+1}^{(-)} = \phi_K P_K^{(+)} \phi_K^T + Q_K \quad [\text{Eq. K6}]$$

Update $$K_K = P_K^{(-)} H_K^T (H_K P_K^{(-)} H_K^T + R_K)^{-1} \quad [\text{Eq. K7}]$$

$$x_K^{(+)} = x_K^{(-)} K_K (Z_K - \hat{Z}_K) \quad [\text{Eq. K8}]$$

+

$$P_K^{(+)} = (I - K_K H_K) P_K^{(-)} \quad [\text{Eq. K9}]$$

where $G^{(-)}$=Predicted value of G matrix or vector $G^{(+)}$=Updated calculation of G matrix or vector $P_K$=Error covariance matrix for the optimal state vector estimate (6×6)

$Q_K$=Error covariance matrix for system noise (Eq. K10)

$K_K$=Kalman filter gain matrix (6×n)

$R_K$=Error covariance matrix for measurement noise (n×n) (Eq. K11)

$H_K$=Ideal, noiseless matrix connects the system state and the measurement at epoch $t_K$ (Eq. K12)

$Z_K$=Measurement vector (DD carrier phases) (n×1)

$\hat{Z}_K$=Predicted measurement vector (DD carrier phases)for nominal trajectory (n×1)

I=Identity Matrix (6×6) prediction equations are the last operations performed during an epoch. The update equations use the new measurements to update the Kalman filter gain ($K_K$), determine the current state ($X_K$), and the covariance matrix ($P_K$).

The $H_K$ matrix that appears in Equations K7 and K9 is a model of the ideal, noiseless connection between the measurement vector (DD carrier-phase) and the state vector (distance vector and its component velocities). Equation K10 specifies this 6×n matrix of matrices where n is the number of "good" measurements available on both longer baselines. The design of the filter is such that the HK matrix can accommodate any number of available measurements and can change in dimension from epoch to epoch. This allows the exclusion of suspected bad measurements due to low C/N$_o$ or poor satellite geometry.

$$H_K = \begin{bmatrix} -(e_{1\hat{x}} - e_{h\hat{x}}) & 0 & -(e_{1\hat{y}} - e_{h\hat{y}}) & 0 & -(e_{1\hat{z}} - e_{h\hat{z}}) & 0 \\ -(e_{2\hat{x}} - e_{h\hat{x}}) & 0 & -(e_{1\hat{y}} - e_{h\hat{y}}) & 0 & -(e_{1\hat{z}} - e_{h\hat{z}}) & 0 \\ -(e_{3\hat{x}} - e_{h\hat{x}}) & 0 & -(e_{3\hat{y}} - e_{h\hat{y}}) & 0 & -(e_{3\hat{z}} - e_{h\hat{z}}) & 0 \\ \vdots & \vdots & \vdots & \vdots & \vdots & \vdots \\ -(e_{3\hat{x}} - e_{h\hat{x}}) & 0 & -(e_{3\hat{y}} - e_{h\hat{y}}) & 0 & -(e_{3\hat{z}} - e_{h\hat{z}}) & 0 \end{bmatrix} \quad [\text{Eq. K10}]$$

where $e_{n\hat{x}}$=X axis component of unit vector from the $n_{th}$ satellite to the VHDS antenna (ECEF)

$e_{n\hat{y}}$=Y axis component of unit vector from the $n_{th}$ satellite to the VHDS antenna (ECEF)

$e_{n\hat{z}}$=Z axis component of unit vector from the $n_{th}$ satellite to the VHDS antenna (ECEF)

$e_{h\hat{x}}$=X axis component of unit vector from the highest elevation satellite to the VHDS antenna (ECEF)

$e_{h\hat{y}}$=Y axis component of unit vector from the highest elevation satellite to the VHDS antenna (ECEF)

$e_{h\hat{y}}$=Z axis component of unit vector from the highest elevation satellite to the VHDS antenna (ECEF)

There are three error covariance matrices in the recursive Kalman filter equations (K5–K9). $Q_K$ is the error covariance matrix derived from the $W_K$ in Equation K1. It models the system noise. The $Q_K$ matrix for The device is shown as Equation K11. As in the STM, $\Delta t$ is equal to 1 second. $S_\theta$ is the special amplitude associated with the white noise driving function of the system. $S_\theta$ is selected as a function of the expected application dynamics. To match the dynamics for a person walking, it is set to about 6 meter.

$$Q_K = \begin{bmatrix} \frac{S_\theta \Delta t^3}{3} & \frac{S_\theta \Delta t^2}{2} & 0 & 0 & 0 & 0 \\ \frac{S_\theta \Delta t^2}{2} & S_\theta \Delta t & 0 & 0 & 0 & 0 \\ 0 & 0 & \frac{S_\theta \Delta t^3}{3} & \frac{S_\theta \Delta t^2}{2} & 0 & 0 \\ 0 & 0 & \frac{S_\theta \Delta t^2}{2} & S_\theta \Delta t & 0 & 0 \\ 0 & 0 & 0 & 0 & \frac{S_\theta \Delta t^3}{3} & \frac{S_\theta \Delta t^2}{2} \\ 0 & 0 & 0 & 0 & \frac{S_\theta \Delta t^2}{2} & S_\theta \Delta t \end{bmatrix} \quad [\text{Eq. K10}]$$

where $S_\theta$=Spectral amplitude of system noise driving function $\Delta t$=Measurement duration (1 second)

$R_K$ is another error covariance matrix in the recursive Kalman filter equations. It is derived from the $V_K$ matrix in Equation K2 and it models the measurement noise. The inventors' formulation of the DD measurement equations results in correlated measurements that require nonzero covariance terms. Equation K11 shows the resulting n×n diagonal matrix. The dimensions of the matrix depend on the number of good DD phase measurements used at that epoch. The term $r_\phi$ is proportional to the expected error in measuring the carrier-phase. This value is about five millimeters.

$$R_K = \begin{bmatrix} 2r_\Phi & r_\Phi & 0 & 0 & \cdots & 0 \\ r_\Phi & 2r_\Phi & r_\Phi & 0 & \cdots & 0 \\ 0 & r_\Phi & 2r_\Phi & r_\Phi & \ddots & 0 \\ 0 & 0 & r_\Phi & 2r_\Phi & \ddots & 0 \\ \vdots & \vdots & \ddots & \ddots & \ddots & r_\Phi \\ 0 & 0 & 0 & 0 & r_\Phi & 2r_\Phi \end{bmatrix} \quad [\text{Eq. K11}]$$

where $r_\Phi$ = Variance of measurement error

The last matrix of the Kalman filter to specify is $P_0$, the error covariance matrix for the initialization input from the LMS search. The 6×60 $P_0$ matrix for the device is shown as Equation K12.

$$P_0 = \begin{bmatrix} \sigma_{\Delta x}^2 & 0 & 0 & 0 & 0 & 0 \\ 0 & \sigma_{\Delta \dot{x}}^2 & 0 & 0 & 0 & 0 \\ 0 & 0 & \sigma_{\Delta y}^2 & 0 & 0 & 0 \\ 0 & 0 & 0 & \sigma_{\Delta \dot{y}}^2 & 0 & 0 \\ 0 & 0 & 0 & 0 & \sigma_{\Delta z}^2 & 0 \\ 0 & 0 & 0 & 0 & 0 & \sigma_{\Delta \dot{z}}^2 \end{bmatrix} \quad [\text{Eq. K12}]$$

where $\sigma_{\Delta x} = \sigma_{\Delta y} = \sigma_{\Delta z} = 0.2$ meter $\sigma_{\Delta \dot{x}} = \sigma_{\Delta \dot{y}} = \sigma_{\Delta \dot{z}} = 1.0$ meter/sec With the designation of $P_0$, The device Kalman filter design is completely specified. The six-state, extended Kalman filter implementation will be accurate, stable, and require relatively few high dimension, matrix operations.

Although the present invention and its advantages have been described in detail, it will be apparent to one of ordinary skill in the art that many changes and modifications can be made thereto without departing from the spirit or scope of the invention as defined by the appended claims.

What is claimed is:

1. A portable system for automatically documenting crash scenes comprising:
    a measurement unit for measuring the position of crash scene element points and for collecting and processing raw satellite signal measurement data including
        a GPS receiver means,
        a GPS antenna means,
        a receiver I/O means,
        a DC/DC power converter means,
        a power supply means, and
        a portable computer means; and
    a reference unit for collecting, storing, and outputting raw satellite signal measurement data used for removing ranging signal distortions that are common to signals received at both the reference and measurement units, including
        a GPS receiver means,
        a GPS antenna means,
        a receiver I/O means,
        a data logger means, and
        a DC/DC power converter means.

2. A portable system in accordance with claim 1, wherein the GPS receiver means of the measurement unit is identical to the GPS receiver means of the reference unit.

3. A portable system in accordance with claim 1, wherein the portable computer means comprises software to provide a user interface, to process measurements from the GPS receiver of the measurement unit and the GPS receiver of the reference unit, to calculate precise relative positioning data for the crash scene element points, and to document the crash scene using a Computer Aided Design (CAD) drawing and a text report.

4. A method, for automatically documenting data from a crash scene using a measurement unit multimedia user interface comprising the steps of:
    i. guiding a user through the process for measuring crash element points,
    ii. designating and labeling crash element points and recording information associated with the crash scene,
    iii. controlling and collecting data from a GPS receiver,
    iv. collecting and storing GPS measurement data,
    v. initiating GPS measurement data processing,
    vi. controlling software for Computer Aided Design (CAD) drawing to develop a drawing of the scaled crash scene,
    vii. controlling software to develop a crash report consisting of textual data recorded about the crash scene and scene elements.

5. A portable system in accordance with claim 3, wherein the software comprises a multimedia user interface that consists of a graphical user interface and which guides a user through a scene measurement.

6. A portable system in accordance with claim 2, wherein the GPS antenna means of the measurement unit is mounted on a survey stake with a bubble plumb/level or electronic level sensor and is placed on the crash element points.

7. A portable system in accordance with claim 2, wherein each of the GPS receiver means comprises parallel satellite signal tracking channels and a carrier, phase lock loop.

8. A portable system in accordance with claim 7, wherein the GPS antenna means of the measurement unit receives GPS satellite signals, the GPS receiver means of the measurement unit processes the satellite signals and transmits the raw satellite data to the portable computer means.

9. A portable system in accordance with claim 2, wherein the GPS antenna means of the reference unit is stationary as it receives GPS satellite signals, which are passed to the GPS receiver means of the reference unit for processing, which sends the result to the data logger for transmission of the raw satellite data and signal measurements to the measurement unit's portable computer means.

10. A method for automatically documenting data in accordance with claim 4, wherein the step of initializing data processing further comprises the steps of selecting satellites, determining accurate positions using Kalman Filter techniques and formatting crash element points into a CAD data file.

11. A method for automatically documenting data in accordance with claim 4, wherein the step of determining accurate crash element positions using Kalman Filter techniques further comprises the steps of:
    i. initializing the Kalman Filter with an approximate first solution,
    ii. calculating satellite orbital positions at measurement times from raw GPS data,
    iii. selecting satellite signals from all available to achieve the optimum solution,
    iv. calculating expected ranges between the satellites and trial measurement antenna positions, and the known or assumed reference antenna position,
    v. determining a model of the carrier phase observables by calculating the expected carrier phase measurement corresponding to the expected satellite-to-antenna ranges, vi. removing measurement errors common to the reference and measurement units' data by combining the measured carrier phase from each, synchronized by GPS measurement time, vii. modeling the removal of measurement errors common to the reference and measurement units' data by combining the expected carrier phase from each, viii. calculating the best solution for the observed data using an iterative process of predicting a trial solution based on statistical models and comparing it with the observed data, ix. converting the Earth Centered Earth Fixed (ECEF) position to a position in a local coordinate system centered at the reference unit's antenna, x. developing a file of crash element positions in local coordinates that is in a format that can be read by a CAD program to create an accurately scaled representation of the crash scene, xi. refining the statistical models in the Kalman Filter as preparation for the next set of measurements based on the correlation of the actual data with the model at the last measurement time, xii. monitoring of solution characteristics to determine its integrity and level of accuracy, and xiii. reinitializing the Kalman Filter when the solution integrity has been determined to have degraded beyond acceptable levels for the designed system's accuracy.

12. A method for automatically documenting data in accordance with claim 11, further comprising the steps of selecting from visible satellites based on orbital position relative to the scene and any observables or figures-of-merit provided by the GPS receiver indicating the presence or absence of signal distortions.

13. A method for automatically documenting data in accordance with claim 4, further comprising the step of augmenting the GPS measurement of the scene elements with measurements made by other means such as a laser range finder, tape measure, or wheel measure by correlating the measurements with any GPS determined position.

14. A method for automatically determining a crash scene dimensions from raw GPS data comprising the steps of:

i. synchronizing reference and measurement module data from measuring crash element points, ii. checking for inaccurate measurements, iii. scaling and transforming the measurements, iv. determining accurate position solution using Kalman Filter techniques, v. validating and reinitializing the filter, if required, with an independent least square comparison, vi. converting the Earth Centered Fixed positions to local scene dimensions, and vii. formatting a CAD drawing file.

* * * * *